United States Patent

Rick

[15] 3,639,100

[45] Feb. 1, 1972

[54] MOLTEN SALT PRE-TREATMENT OF REACTANTS FOR TiCl₄ OXIDATION

[72] Inventor: Christian E. Rick, Wilmington, Del.

[73] Assignee: E. I. du Pont de Nemours and Company, Wilmington, Del.

[22] Filed: July 24, 1969

[21] Appl. No.: 844,604

Related U.S. Application Data

[63] Continuation of Ser. No. 551,226, May 19, 1966.

[52] U.S. Cl. ............................23/202 V, 23/21, 23/24 Z, 23/200, 23/142, 23/182 V, 23/140
[51] Int. Cl. ..........................................................C01g 23/04
[58] Field of Search ...............23/1 D, 140, 142, 200, 202 V, 23/182 V, 16, 21; 263/52

[56] References Cited

UNITED STATES PATENTS

| | | | |
|---|---|---|---|
| 1,620,880 | 3/1927 | Filmer | 23/140 |
| 2,559,638 | 7/1951 | Krchma et al. | 23/202 V |
| 3,208,866 | 9/1965 | Lewis et al. | 23/202 V X |
| 3,214,284 | 10/1965 | Wilson | 23/202 V X |
| 3,215,496 | 11/1965 | Groves | 23/202 V |
| 3,361,525 | 1/1968 | De Rycke et al. | 23/140 |
| 3,488,148 | 1/1970 | Krinor | 23/202 V |

OTHER PUBLICATIONS

Beck et al. (1), A.P.C. Abandoned Application, Ser. No. 292,742, Published July 13, 1943.
Beck et al. (2), A.P.C. Abandoned Application, Ser. No. 393,258, Published July 13, 1943.

Primary Examiner—Herbert T. Carter
Attorney—Frank R. Ortolani

[57] ABSTRACT

The production of metal oxide powders by the reaction of vaporous halides of titanium, zirconium, iron, aluminum, silicon and the like with oxygen is improved by preheating and conditioning at least one of the reactants by contact with molten salt prior to the reaction. The method permits carrying out the reaction in the presence of salt vapor as well as condensed particles of these salts.

6 Claims, No Drawings

MOLTEN SALT PRE-TREATMENT OF REACTANTS FOR TICl₄ OXIDATION

CROSS-REFERENCES

This application is a continuation-in-part of my application, Ser. No. 551,226 filed May 19, 1966.

BACKGROUND

Finely divided pigmentary metal oxides, such as $TiO_2$, can be prepared by reacting at an elevated temperature a vaporous halide, particularly a chloride, of the metal with an oxidizing gas such as air, oxygen or water vapor and mixtures thereof. In carrying out these reactions, at least one of the reactants is heated sufficiently so that, upon mixing with the other reactant in a closed reaction zone, reaction occurs and the desired fine metal oxide is formed. Thus, in manufacturing pigmentary $TiO_2$ in accordance with for example the disclosures of U.S. Pat. Nos. 2,488,440 and 2,559,638 the $TiCl_4$ and oxidizing gas are separately preheated to about 800°–1,000° C. in corrosion resistant ceramic heating equipment such as in a silica tube or conduit. Such apparatus is, however, costly and subject to easy breakage and thermal failure, especially when, as is often desirable, preheat temperatures ranging up to about 1,400° C. and to as high as about 1,800° C. are undertaken. In addition, this type of apparatus affords an unsatisfactory heat transfer due to its relatively low heat conductivity. When the preheating is carried out in metallic heat transfer equipment, apparatus corrosion and related problems arise and as a result undesirable contamination of the reactant and resulting pigment product is encountered.

In U.S. Pat. No. 3,208,866 improved $TiO_2$ pigment is obtained by introducing alkali or alkaline earth salts into the reaction zone in amounts up to 1 percent by weight based on the $TiO_2$ being produced. In this process the salts are introduced into the already preheated reactant or reactants.

Such processes involve two types of reactants. One is the halide of a metal which is to be oxidized in the oxidation zone. Typical halides are $TiCl_4$, $FeCl_3$, $SiCl_4$, $AlCl_3$, $NbCl_5$, $ZrCl_4$. The other is the oxidant which may be oxygen or water. The reactions in the case of preparing $TiO_2$ are illustrated in the equations:

$$TiCl_4 + O_2 \rightarrow TiO_2 + 2Cl_2$$
$$TiCl_4 + 2H_2O \rightarrow TiO_2 + 4HCl$$

In addition to the primary reactants other ancillary gases or vapors such as byproduct chlorine, HCl, or inert gases such as nitrogen, or argon may be mixed with one or both of the reactants or separately introduced. Mixtures of the metal halides may be oxidized. For example, it is well known to cooxidize a relatively small amount of $AlCl_3$ along with $TiCl_4$ in the manufacture of $TiO_2$ pigment.

SUMMARY OF THE INVENTION

In accordance with the present discovery, in the oxidation of metal halide vapors for production of the corresponding oxides, at least one of the reactant halide, the oxidizing reactant and any ancillary gas is preheated by direct and intimate contact with a compatible molten inorganic compound or mixture of such compounds. The halide reactant and oxidizing reactant are treated separately from each other or in admixture with ancillary gas. Temperature is thereby increased so that upon introduction into the reaction zone it will cause initiation of the metal oxide-forming reaction, in most instances.

In addition to mere preheating of the gases or vapors entering the reaction zone, the molten bath may also be chosen on the basis of its vapor pressure to supply the desired quantity of additives to the reaction. Metal ion nucleants according to U.S. Pat. No. 3,208,866 may be thus introduced. Furthermore, larger quantities of, for example, alkali metal chloride vapors can be evaporated into the gas stream from the molten body compound to saturate that stream at a temperature above about 600° C., and the stream cooled below the dew point just prior to or in the reaction zone to provide for carrying out the production of metal oxides in the presence of condensed particles of salt. These particles may act as nuclei or reaction sites. Such condensed particles are usually liquid at the reaction temperature.

The molten inorganic substance used as the pretreating agent may be a single compound or a mixture of compounds forming a molten bath having a vapor pressure of not more than one atmosphere at 700° C. and a melting point not greater than about 1,600° C. Preferred compounds are the halides of the alkalinous metals, Mg, Ca, Sr, Ba, Li, Na, K, Cs, Rb and the alkali hydroxides and carbonates. The composition of the melt is selected from compounds which are inert toward the gas or reactant to be treated. For example, in pretreating water vapor for reaction with $SiF_4$, the alkali hydroxides would be preferred. For pretreating $TiCl_4$ for the preparation of pigmentary $TiO_2$, the alkali or alkaline earth chlorides or mixtures thereof would be selected and should be free of discoloring impurities volatile enough to be carried into the subsequent oxidation reaction zone.

The preheating and preconditioning herein contemplated can be brought about through direct contact and heat exchange between the gaseous reactant or reagent being treated and an excess of a fusible, inert, noncontaminating inorganic, ionic, metal compound, or mixture, maintained as a molten bath in a treating zone associated with a reactor employed to carry out the metal oxide-forming reaction. Preferably the molten bath is made up of a metal salt, especially a chloride or fluoride, or mixture of such salts, selected from the alkali metals (lithium, sodium, potassium, rubidium, cesium), the alkaline earth metals (magnesium, calcium, strontium, barium) or cerium or zinc, which metals form white, nondiscoloring oxides. In addition to the chlorides or fluorides of such metals, use can be made of their other halides as well as the sulfates, hydroxides, silicates, phosphates, titanates, borates and carbonates of said metals, provided the bath formed is thermally stable at its melting point and under the temperatures at which desired preheating and conditioning is carried out. The composition of the bath may be selected from the various ingredients mentioned to suit the particular process. In various applications, these materials will provide combinations for operating at any desired temperature in the 600° C. to 2,000° C. range without undue decomposition or more than the desired amount of vaporization. The size of the bath should be large enough that its heat content will be large relative to any heat losses sustained to the surrounding area and the gaseous reactant treated so that as a result of contacting the gaseous product therewith sufficient heat will be transferred to and absorbed by said reactant that initiation of the metal oxide-forming reaction will take place on introduction of the treated gas into the reactor for reaction with another reactant, similarly or otherwise, but separately, preheated or preconditioned.

In the preheating or preconditioning operation, a gaseous reactant, such as a volatile metal halide, preferably with a boiling point below about 600° C., especially a metal chloride or fluoride, e.g., $SiCl_4$, $ZrCl_4$, $AlCl_3$, $FeCl_3$, $SiF_4$, $TiF_4$, $ZrF_4$ and their compatible mixtures, is fed from a suitable source of supply directly into a molten bath in the treating vessel. The higher boiling reactants may be fed in the condensed state to the molten bath to be evaporated therefrom into the reactant vapor stream. The reactant is immersed in, bubbled or otherwise passed through the bath and remains in direct contact therewith until the preheating and conditioning desired is effected. That is, treatment continues until the temperature of the gas becomes increased to a range of from about 600°–1,800° C. or as high as 2,000° C., if desired, and preferably until a temperature within a range of from 700°–1,400° C. is reached with, if desired, metal ion nucleant incorporation. Thus, in treating vaporous $TiCl_4$ prior to reacting it at 800°–1,400° C. with an oxidizing gas, such as oxygen, air, oxygen-enriched air, in the presence of water vapor to obtain pigment quality rutile $TiO_2$ in accordance with, for example, the procedures of U.S. Pat. Nos. 2,488,439, 2,559,638 and 2,791,490, the $TiCl_4$ reactant, preferably after vaporization in a separate boiler, is introduced into a separate, electrically or otherwise externally heated treating vessel which is associated with a corrosion resistant oxidation reactor of the type shown in U.S. Pat. No. 2,791,490. Prior to such introduction, a potassium chloride-lithium chloride salt mixture is formed and melted in said vessel whereby a salt bath maintained at a temperature of 900° C. is provided therein. Following introduction, the vaporous $TiCl_4$ is passed through the bath and as a result its temperature is increased to that of the salt melt and predetermined, small amounts of lithium and potassium ions are desirably incorporated in the vaporous $TiCl_4$. The presence of such ions during oxidation of the $TiCl_4$ will advantageously promote and regulate ultimate $TiO_2$ product particle size and impart other essential pigment properties thereto, including improved in-process high uniform bulk density and carbon black undertone characteristics and improved color, texture and tinting strength. These advantages accrue, as taught in U.S. Pat. No. 3,208,866, when the oxidation of the $TiCl_4$ is carried out in the presence of from 50–100,000 parts per million of water vapor, based on the $TiO_2$ and an amount ranging from 0.01–10,000 and preferably from 1–5,000 parts per million of a metal ion selected from the above mentioned alkali, alkaline earth and cerium metals, or mixtures thereof, said amount being based on the $TiO_2$ being produced.

In addition to the contemplated separate heating and treating of primary reactants by preferably bubbling said reactants through a melt and prior to their introduction into a reaction zone, treatment is also contemplated in the invention of other gaseous ancillary agents and inert gases such as nitrogen, argon, helium, or reaction byproduct gases such as chlorine, hydrogen chloride, hydrogen fluoride or compatible mixtures thereof. Likewise various heating bath compounds and mixtures can be used. The selection thereof depends on the type of gaseous material to be heated and treated and the inertness, fusibility and vapor pressure which will be required. Thus in respect to salt fusibility, the alkaline earth sulfates and hydroxides are not fusible below their decomposition temperatures but are rendered fusible when employed in conjunction with other salts and hence can be employed in combination with other fusible compounds to control vapor pressure and other properties desired in the melt as can any desired mixture of the compounds mentioned designed to control the physical properties of the melt including melting point, vapor pressure, viscosity, etc. The desirability for relative inertness is apparent from the following. When alkali carbonates are used for heating $TiCl_4$, for example, they tend to react with $CO_2$ liberation and form alkali titanates. While titanate presence in the melt is permissible, the continued formation thereof will represent a loss of reactant and dilution of final reaction byproducts with carbon dioxide. For heating water vapor, use is preferred of molten alkali metal sulfates and hydroxides and the various alkali and alkaline earth silicates, titanates, aluminates and mixtures thereof. The very high melting compounds are preferably mixed with other salts to lower the melting point. Since preheating temperatures ranging from about 600° to about 1,800° C. and higher are contemplated consideration must be given to the vapor pressure of the salt bath components.

In controlling the amount of conditioning agent incorporated in the gas under treatment only a portion of such gas need be treated and then subsequently blended with the remainder or introduced separately into the reaction chamber. Inert or recycled secondary gases can be used as carriers of the modifiers from the molten material but preferably one or both of the primary reactants is conditioned in this manner.

In selecting the molten salt heating medium used care should be taken to avoid any chemical reaction between said medium and the gas being heated. For example, if $TiCl_4$ is to be heated to a high temperature use of a molten KF bath might be considered. However, some likelihood exists that the following reaction can occur:

$$TiCl_4 + 4RF \rightarrow TiF_4 + 4KCl$$

In this event the $TiF_4$ formed would not be reactive with oxygen or air and a relatively poor titanium oxide yield would result. In such instance use is preferred of $CaCl_2$ or $CaCl_2 \cdot KCl$ mixtures.

Preferably and to avoid undesired side reactions the molten baths used are selected from salts having the same halogen anion as is present in the volatile metal halide being heated. Any desired method for heating to the molten state can be employed. The problem of heating is somewhat complicated particularly at the high temperatures contemplated and due to the presence of the reactant gases which, at high temperatures are quite corrosive toward heating elements and containers. By using suitable vessels to contain the material and by placing the heating elements below the reactant inlet very little chance for corrosion will be found to exist. The desired heating can be brought about by recourse to graphite or metal electrodes so that in instances of conductive materials such as the halides, sulfates and hydroxides, the heating results from the passage of alternating current though the bath. When conduction is relatively poor as in the case of silicates, for example, use is made of a submerged susceptor heated by induction. Submerged heat exchange tubes fired by internal combustion can also be used. The last two devices have the advantage of enabling one to initiate heating of the solid salt, as would submerged electrical resistance heating units. In these internal heating arrangements the walls of the vessel remain relatively cool and can be coated with a suitable solid material, such as a frozen layer of the salt itself, if desired to provide protection against corrosion.

Both the composition and temperature of the molten bath may be chosen to control its vapor pressures so that predetermined amounts of the bath constituents are vaporized into the gas stream for introduction into the reaction zone. The amount of material may be sufficient to supply up to 1 percent by weight, based on the metal oxide being produced, of a metal ion nucleant as previously mentioned. Further, than this, larger quantities of the bath material may advantageously be evaporated into the gas stream. The bath constituents most suited to this use are the chlorides of the alkali metals.

Valuable product characteristics are obtained when oxidation is accomplished in the presence of salt particles condensed from the gas, wherein at least one reactant is pretreated by direct contact with molten salt, to a temperature higher than preheat temperature desired for the oxidation process, cooling the said pretreated reaction component vapor stream to condense salt particles, and carrying out the oxidation reaction in the presence of the condensed salt particles which may be in liquid or solid state on entering the oxidation reaction zone.

To accomplish this particle formation, a gaseous agent is pretreated in a molten bath containing volatile components which will evaporate into the gas stream in amounts such that the dew point with respect to the bath material in the gas stream will exceed 600° C. This stream is then cooled, either prior to entering the reaction zone or in the reaction zone, to below said dew point thereby providing condensed particles of bath material in the reaction zone. The preferred volatile components are the alkalinous metal halides which group includes the alkali and alkaline earth metal halides especially the chlorides. The cooling is preferably effected by mixing the gas stream containing the bath components with another cooler gas which is most appropriately selected from the gases normally entering the reaction zone. Examples of cooling gases are a separate portion of the agent thus pretreated, an inert gas or recycled byproduct gas such as HCl or chlorine. In some instances the dew point of the incoming pretreated gas stream may be above the reaction zone temperature in which case the desired particle formation will occur on entering the reaction zone. Cooling may also be effected by a spray of a volatile liquid, preferably the metal halide being oxidized such as $TiCl_4$, $AlCl_3$, $SiCl_4$, $FeCl_3$.

The cooling of the preconditioned reaction component may be done using cooler reactant, e.g., $TiCl_4$, added as solid, liquid or vapor; cooler inert material, e.g., $N_2$ or $Cl_2$ as liquid or vapor, or loss of temperature to a heat sink such as the absorption of heat by dissociation of chlorine.

Product characteristics and growth of the solid oxidation product particles are influenced by the presence of the condensed salt particles during the oxidation reaction. For example with titanium dioxide the acicular characteristics of the rutile product and the resulting benefits in pigment particle efficiency are accentuated when the oxidation reaction is accomplished in the presence of such condensed salt particles.

Salt particle contents up to major amounts, e.g., equimolar to the preconditioned reactant, are contemplated as useful in oxidation reactions.

The molten bath pretreatment of this invention may be applied to one or both of the reactants or a stream of ancillary gas for separate introduction into the oxidation zone. All three may be treated separately with different baths at different temperatures.

The molten bath may also be used as a source of other additives for the oxidation reaction. For example it is known that advantages accrue from cooxidation of halide of aluminum, zinc or cadmium with $TiCl_4$. This $AlCl_3$, $ZnCl_2$, or $CdCl_2$ may be added to the bath for vaporization during the pretreatment of the halide or the inert streams. In such cases the bath must be inert toward these additives e.g., it would not contain alkali hydroxides.

During operation wherein volatile agents are being transferred from the bath to the reaction it is obvious that, to maintain constant conditions for the process, the continuous or periodic replenishment of such agents in the bath is practiced.

To a clearer understanding of the invention the following specific examples are given. These are merely illustrative and are not to be construed as limiting the underlying principles and scope of the invention.

EXAMPLE I

In this example a $TiCl_4$ reactant is preheated and preconditioned prior to reaction with an oxygen-containing gas to produce pigmentary $TiO_2$.

To a 50-gallon capacity immersed electrode slat bath furnace vessel, heated by electric current conduction, a molten salt mixture consisting of $KCl$-$CaCl_2$ and containing about 10 mol percent $KCl$, is charged until a pool of salt almost filling the vessel is formed. The vessel is provided with a $TiCl_4$ inlet conduit which leads into the lower portion of the salt pool, said conduit being composed of nickel outside the furnace and of graphite within the furnace. The terminous of the graphite portion within the pool is provided with a plurality of small openings or apertures to enable $TiCl_4$ admission in small streams into the salt melt. The furnace is closed at its top with the closure element provided with an inlet port for loading additional salt into the bath and a separate conduit for conveying hot $TiCl_4$ vapors evolved in the vessel into an associated reactor wherein oxidation of the $TiCl_4$ treated in the furnace takes place. The process is commenced by filling the vessel nearly full of the molten salt charge while charging it with argon through the $TiCl_4$ inlet. The temperature of the salt pool is then increased to and maintained at about 900° C. by supplying electrical power to the immersed electrodes. $TiCl_4$ liquid is then metered into the inlet line to replace the argon flow, becomes vaporized as it flows through said inlet and is passed through the molten salt in vaporous condition in a series of small bubbles. On leaving the preheater vessel for introduction into the reactor the $TiCl_4$ is at a temperature of about 890° C. and contains nearly 116 p.p.m. by weight of $KCl$ vapor. Upon being oxidized in a slot jet type of reactor of the type described in U.S. Pat. No. 2,791,490 by reaction with oxygen-enriched air separately preheated to 800° C., a high quality white rutile $TiO_2$ pigment is obtained.

EXAMPLE II

A ceramic vessel provided with inlet and outlet conduits and containing a cylindrical silicon carbide susceptor mounted with its axis in a vertical position is charged with sodium silicate of about 70 mol percent $SiO_2$. The walls of the vessel are air cooled to maintain a thin layer of solid sodium silicate on the inner surface. The vessel is directly connected by a vertical ceramic outlet conduit to a separate reaction zone wherein vapor phase oxidation of $TiCl_4$ to $TiO_2$ could be carried out. By induction heating of the susceptor, the central zone of the silicate body is brought to a temperature of 1,600° C. An air-oxygen mixture is introduced through a ceramic inlet pipe into the liquid silicate just below the susceptor where the temperature is about 900°–1,000° C. The gas rises through the melt without appreciable contact with the susceptor, is heated to about 1,500° C. and is then passed into the oxidation zone wherein it is quickly mixed and reacted with $TiCl_4$ vapor separately preheated to 600° C. to produce pigment quality $TiO_2$. Some vaporization of $Na_2O$ from the silicate bath occurs during the air-oxygen treatment which beneficially affects $TiO_2$ pigment particle size. To maintain this effect, $Na_2O$ removed during the treatment is replenished in the bath.

EXAMPLE III

Employing an apparatus of the type described in example I, except a ceramic is used in place of the graphite, water vapor is bubbled through a body of molten $KOH$ held at 800° C. and is then conducted to an associated reaction zone for reaction with $SiCl_4$ vapor being charged to said zone to produce $SiO_2$ from the reaction. Due to the vapor pressure of $KOH$ at the temperature mentioned, approximately 400 p.p.m. of $KOH$ based on the $SiO_2$ produced is carried to the reaction zone and exerts a particle size control on the product which is relatively fine and closely sized.

EXAMPLE IV

In this example a $TiCl_4$ reactant is preheated and preconditioned prior to forming a reaction mixture with an oxygen-containing gas, said mixture containing salt particles condensed from the preheated vapor by cooling below the dew point of said vapor, and reacted to produce $TiO_2$.

The salt bath vessel of example I is charged with $KCl$. The molten $KCl$ is heated to about 1,300° C. and the introduction of $TiCl_4$ into the bath is initiated as discussed in example I. The conditioned $TiCl_4$ on leaving the vessel is at a temperature of about 1,280° C. and contains about one third volume concentration of $KCl$ vapor in the heated $TiCl_4$. The preconditioned $TiCl_4$ before reaction with the oxygen-containing gas in a slot jet type of reactor of the same type mentioned in example I, is cooled to about 900° C. by introduction of cooler $TiCl_4$ to "fog out" particles of $KCl$. The preconditioned $TiCl_4$ and oxygen-containing gas reactants containing the salt particles react to produce a high quality $TiO_2$ pigment. The product displays excellent pigment characteristics in that the content of acicular particles prevents loss of pigment efficiency in highly pigmented coatings such as paints or paper coatings.

While the invention has been described with certain detail, it will be apparent that changes can be made without departing from its scope.

What is claimed is:

1. In a process for the vapor phase reaction of titanium halide with an oxidizing gas in a reaction zone to produce pigmentary titanium dioxide, the improvement which comprises:
   a. separately pretreating the gaseous titanium halide reactant by direct contact thereof with an excess of a molten body of an inert, relatively involatile, fusible, inorganic compound, chemically inert toward said titanium halide, of a metal selected from the group consisting of potassium, sodium, lithium, rubidium, cesium, magnesium, calcium, strontium, barium, cerium and zinc, and mixtures thereof, thereby to effect heating of the titanium halide to a temperature ranging from about 600°–2,000° C. while evaporating therein a quantity of said inorganic compound sufficient to provide in said reaction zone an amount of metal ions between 0.01 and 10,000 parts by weight per million parts of the titanium oxide product being produced, and b. removing the resulting pretreated titanium halide containing said metal ions, followed by introduction thereof into said reaction zone.

2. The process of claim 1 in which the molten body is a molten metal halide and the titanium halide during contact therewith attains a temperature sufficient to initiate the titanium dioxide forming reaction upon introduction and admixture in the reaction zone with the oxidizing gas.

3. The process of claim 1 in which the molten body is maintained at from 600°–1,800° C.

4. The process of claim 1 in which the molten body consists of a mixture of $KCl$–$CaCl_2$ maintained at a temperature ranging from 700°–1,400° C.

5. The process of claim 1 wherein the pretreated gaseous titanium halide stream contains sufficient vapor from the molten body compound to saturate the stream at a temperature above about 600° C., and that gas stream is cooled, upon entering the reaction zone, to a temperature below the dew point with respect to the molten body compound contained therein thereby providing condensed particles of said molten body material in the reaction zone.

6. The process of claim 2 wherein the molten body is composed of sodium chloride or potassium chloride.

* * * * *